Figure 1:
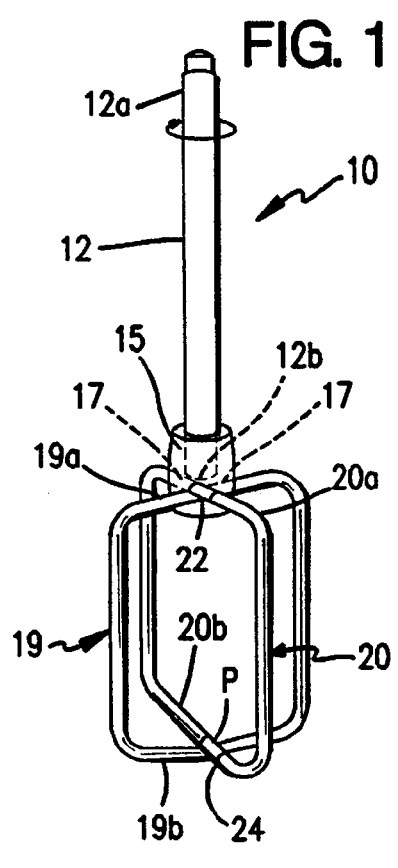

United States Patent [19]

Diore et al.

[11] Patent Number: 5,584,112
[45] Date of Patent: Dec. 17, 1996

[54] PROCESS FOR THE PRODUCTION OF A WHISK FOR AN ELECTRIC KITCHEN BEATER

[75] Inventors: Christian Diore, Saint Germain du Corbois; Jean-Jacques Linger, Remalard, both of France

[73] Assignee: Moulinex S.A., Bagnolet, France

[21] Appl. No.: 469,874

[22] Filed: Jun. 6, 1995

[30] Foreign Application Priority Data

Jun. 6, 1994 [FR] France .................................. 94 06906

[51] Int. Cl.⁶ .................................................. B23P 11/00
[52] U.S. Cl. .............................. 29/434; 29/458; 29/460; 29/527.3; 366/343; 264/263; 264/271.1
[58] Field of Search .............................. 29/434, 458, 460, 29/527.1, 527.2, 527.3; 366/129, 342, 343, 344; 264/242, 263, 271.1, 279

[56] References Cited

U.S. PATENT DOCUMENTS 3,512,223  5/1970  Willinger .................................. 264/279

FOREIGN PATENT DOCUMENTS 2815697  10/1979  Germany .................................. 366/343
3225450   1/1984  Germany .................................. 366/343

*Primary Examiner*—David P. Bryant
*Attorney, Agent, or Firm*—Young & Thompson

[57] ABSTRACT

A process for the production of a whisk for an electric kitchen beater, comprising a rod (12) having at one of its ends a hub (15) carrying at least two loops (19, 20) each forming an agitator and made from a metallic wire whose ends are secured to the hub, the hub (15) being produced by an over-molding operation by injection of a plastic material onto the rod (12) and onto the two loops (19, 20) adjacent the rod. Before over-molding the hub on the end of the rod and adjacent portions of the loops, the loops are positioned in a mold in planes transverse to the horizontal axis of the rod. Then, after molding, the loops are swung down into their final position in which their sections (19b, 20b) opposite the hub (15) contact each other. At this contact point (P), the loops are secured together as by welding. In this way, a complicated mold for the hub, that would accommodate the loops in their final position, is not necessary.

7 Claims, 1 Drawing Sheet

PROCESS FOR THE PRODUCTION OF A WHISK FOR AN ELECTRIC KITCHEN BEATER

The present invention relates to a process for the production of a whisk for an electric kitchen beater comprising a rod having a longitudinal axis and comprising, at one of its ends, a hub bearing at least two loops each forming an agitator produced from a metal wire whose ends are secured to the hub, laterally of this latter.

It relates more particularly to a process for the production of such a whisk for an electric kitchen beater, according to which the hub is produced by an operation of over-molding by injection of a plastic material on the end of the rod and on the respective ends of two loops.

In such a known process for production, the operation of over-molding has taken place, until the present, by first disposing the two loops in the mold, in a mutual definitive position of assembly, in "axial" alignment with the rod. This over-molding is difficult to carry out and requires a particularly complicated mold, of the type having several molding drawers, and consequently being of very high cost.

The invention has as its object to overcome these drawbacks and to provide a process for the production of a whisk with an over-molded hub of plastic material, which will be simple, economical and perfectly adapted to automated mass production.

According to the invention, the operation of over-molding by injection of a plastic material, on the one hand, is preceded by an operation consisting in positioning in the mold the two loops along planes which are respectively transverse to the longitudinal axis of the rod so as to permit ultimately an axial demolding, and on the other hand, is followed successively by an operation consisting in pivoting each of the two loops about its ends to bring said loops into an assembly position in which the sections of the loops opposite the hub are rejoined in their medial region at a junction point located on the longitudinal axis of the rod, and by an operation of securement of the loops together at their point of junction.

Thanks to this unjoined and transverse arrangement of the loops in the mold relative to the rod, and no longer joined and in direct alignment with the rod as in the prior art, the operation of over-molding by injection of the plastic material permitting producing the hub is greatly facilitated, as well as the subsequent demolding, and the mold tooling serving for this over-molding is thereafter considerably simplified and hence of substantially less cost.

Preferably, the planes of positioning of the two loops in the mold are substantially horizontal and orthogonal to the longitudinal axis of the rod, facilitating even more the operations of over-molding and of demolding using a mold which is very simple.

The invention also relates to a whisk for an electric kitchen beater obtained by the practice of the process according to the invention.

Figure 2:
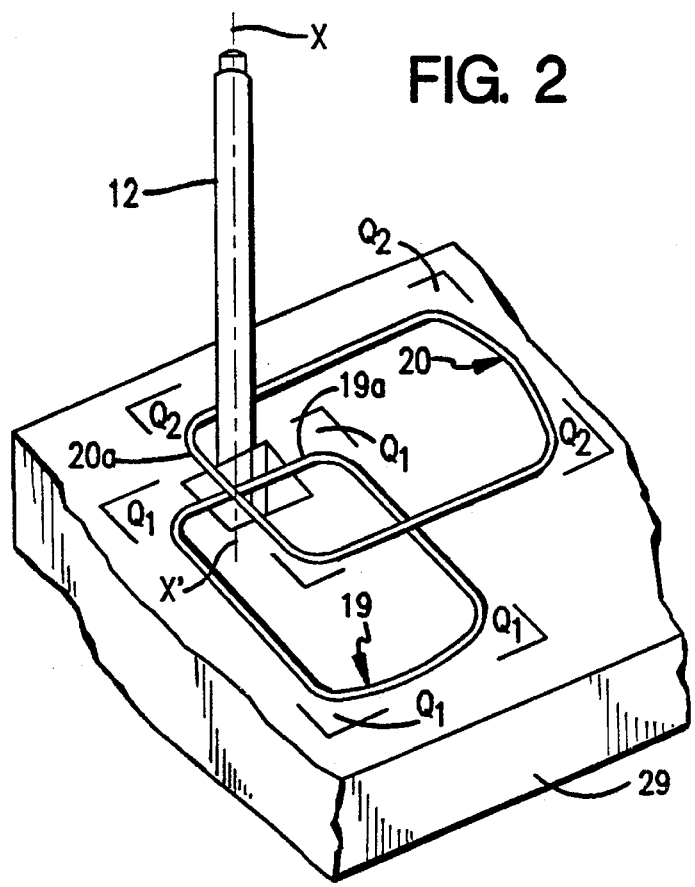
Figure 3:
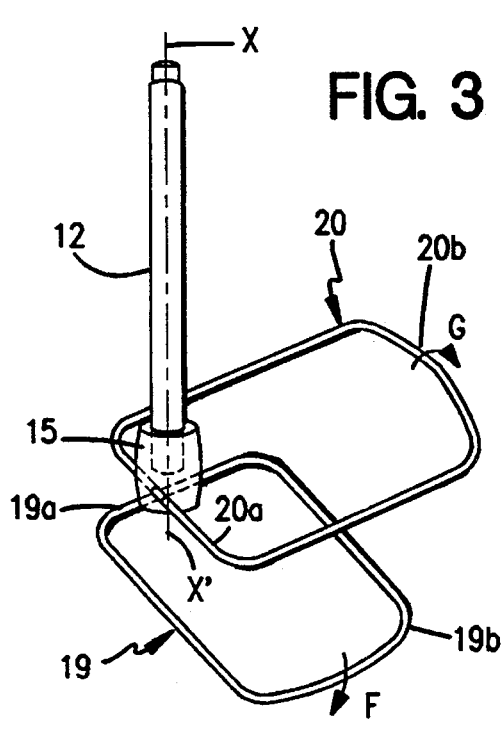
Figure 4:
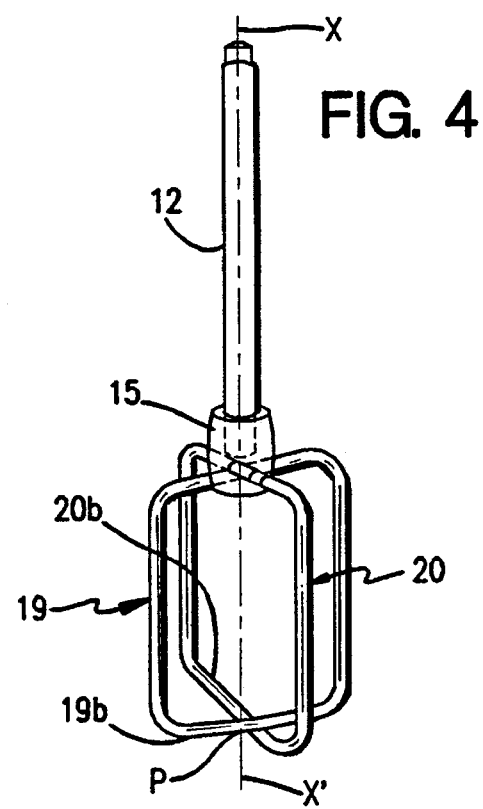

The characteristics and advantages of the invention will become apparent from the description which follows, by way of non-limiting example, with reference to the accompanying drawing, in which:

FIG. 1 is a schematic view in perspective of an example of whisk for a beater obtained by the practice of a process according to the invention; and FIGS. 2, 3 and 4 show different stages in the process of production of the whisk of FIG. 1.

According to one embodiment, and with reference to FIG. 1, there is shown at 10 a whisk for an electric kitchen beater, comprising a metallic rod 12 whose one end 12a is adapted to be driven in rotation by an internal motor train of the beater (not shown) and whose other end 12b comprises a hub 15 of elongated shape, which is over-molded integrally of plastic material suitable for contact with food products, for example polypropylene.

In this example, FIG. 1, the hub 15 is pierced at its lower portion by two radial bores 17, orthogonal to each other and slightly offset in height relative to each other, and in which, during production by over-molding of the hub 15, are arranged frictionally respectively the two ends constituting the medial portions of the sections 19a and 20a of two identical loops or rings 19 and 20 each of a metal wire, for example stainless steel, adapted to form an agitator. At present, the two loops 19 and 20 have a general shape which is approximately rectangular and thus constitute two closed loops each obtained for this purpose by assembling their two ends, at their section 19a, respectively 20a, by any appropriate means such as for example by a bead of solder 22 of which only one, relating to the loop 20, is visible in FIG. 1.

Opposite the hub 15, the two sections respectively 19b and 20b of the two loops 19 and 20 cross orthogonally to each other, in their medial region, and are assembled fixedly to each other at their crossing point P by any suitable means such as for example a spot weld designated 24 in FIG. 1.

In the purely illustrative and non-limiting framework of the whisk 10 of FIG. 1, there will now be described the process for production, according to the invention, of this type of whisk 10.

The two loops 19 and 20 of stainless steel wire are first polished, then are each shaped substantially as a rectangle by fixing, for example by welding, their two ends to form their section 19a, respectively 20a, adapted to be borne by the hub of the whisk.

The two unjoined loops 19 and 20 thus formed are then disposed respectively in two suitable recesses (not shown) of a mold in open position, of which only the fixed element 29 has been specifically illustrated in FIG. 2, in two respective horizontal positioning planes $Q_1$ and $Q_2$ which are orthogonal to the longitudinal axis XX' of the metallic rod 12 in vertical position. In this example, as shown in FIG. 2, the two flat loops 19 and 20 are orthogonal to each other.

After this orthogonal positioning of the two loops 19 and 20 in the mold relative to the rod 12, the mold is closed and the plastic material is then injected into the mold in the usual manner to produce the hub 15 (FIG. 3) by over-molding on the end of the rod 12 and on the medial portion of the two respective sections 19a and 20a of the two loops 19 and 20. After solidification of the plastic material constituting the hub 15, the demolding of the assembly thus formed is carried out by separating axially the fixed elements 29 and the movable elements of the mold.

It should be emphasized here that, in a more general manner, the two loops of the whisk can be disposed in the mold in respective planes that are transverse relative to the longitudinal axis of the rod of the whisk, the only requirement to be observed being that the positioning of the two loops be such that it permits axial demolding of the assembly, so as to use a mold of simple design. Preferably, the two loops of the whisk are positioned flat in the mold, orthogonally to the longitudinal axis of the rod as shown in the example of FIG. 2, so that the mold utilized in this case is very simple.

The hub 15 being over-molded, as shown in FIG. 3, the next step of the process according to the invention consists in pivoting into the axial direction the two loops 19 and 20, respectively in the directions of the two arrows F and G, about two pivotal axes constituted respectively by the two medial portions of the two loop sections 19a and 20a within the hub 15. The pivoting of these two medial portions in the hub 15 over-molded in plastic material is for example facilitated by the treatment of polishing the two loops 19 and 20 of stainless steel wire, thereby limiting the friction between the two plastic-metal materials.

By this pivoting of the two loops 19 and 20, the sections 19b and 20b of the two loops opposite the hub 15 cross in their medial region, in two orthogonal planes, at a crossing point P located on the longitudinal axis XX' of the rod 12, as shown in FIG. 4.

The two crossing sections 19b and 20b of the two loops 19 and 20 are then fixed to each other, for example by welding, at their crossing point P, thereby permitting obtaining the whisk 10 as illustrated in FIG. 1.

Of course, the process of production according to the invention which has been described with reference to a whisk with loops of substantially rectangular shape, is applicable also to any whisk of a beater having loops of various geometrical forms respectively adapted to the kitchen task to be performed, without thereby departing from the scope of the invention.

We claim:

1. In a process for the production of a whisk for an electric kitchen beater comprising a rod having a longitudinal axis and comprising, at one of its ends, a hub carrying two loops each forming an agitator made from a metal wire whose ends are secured to the hub, said hub being formed by an over-molding operation by injection of plastic material on the end of the rod and on the respective ends of the two loops, the improvement comprising: positioning the rod and the two loops in a mold such that the two loops are disposed in respective planes transverse to the longitudinal axis of the rod, over-molding plastic on the end of the rod and over portions of the loops adjacent the rod to form a plastic hub about said end of said rod and said portions of said loops, then pivoting each of the two loops about the hub to bring said loops into an assembly position in which sections of the loops opposite the hub touch at a junction point located on the longitudinal axis of the rod and at a medial region of each of said sections of said loops, and then securing the loops to each other at said junction point.

2. Process according to claim 1, wherein the respective planes of the two loops in the mold are substantially horizontal and orthogonal to the longitudinal axis of the rod.

3. Process according to claim 2, wherein the two loops are disposed orthogonally to each other in their respective horizontal planes in the mold, such that the sections of the two loops opposite the hub, after pivoting each of said loops, cross at said junction point at said medial regions of said sections at an angle of approximately 90°.

4. Process according to claim 1, wherein, prior to positioning the two loops in the mold, the respective ends of each of the two loops are secured together.

5. Process according to claim 4, wherein the respective ends of each of the two loops are secured together by welding.

6. Process according to claim 1, in which the two loops are made of stainless steel, and wherein, before the two loops are positioned in the mold, the ends of the two loops about which the hub will be over-molded are polished to facilitate swinging movement of the loops relative to the rod and the hub.

7. Process according to claim 1, wherein the loops at said junction point are secured together by welding.

* * * * *